United States Patent
Lewis

(10) Patent No.: US 6,290,449 B1
(45) Date of Patent: Sep. 18, 2001

(54) VEHICLE CARRIER

(76) Inventor: Carl Lewis, 4215 Dellwood St., San Diego, CA (US) 92111

(*) Notice: Subject to any disclaimer, the term of this patent is extended or adjusted under 35 U.S.C. 154(b) by 0 days.

(21) Appl. No.: 09/503,416

(22) Filed: Feb. 14, 2000

(51) Int. Cl.[7] ...................................................... B60P 3/12
(52) U.S. Cl. .................................................. 414/563; 414/494
(58) Field of Search ................................. 414/563, 494; 280/402

(56) References Cited

U.S. PATENT DOCUMENTS

| | | | |
|---|---|---|---|
| 4,149,643 | * | 4/1979 | Skala et al. ............................ 414/563 |
| 4,555,214 | * | 11/1985 | Morton ................................. 414/563 |
| 4,761,111 | * | 8/1988 | Brown ................................. 414/563 |
| 5,013,209 | * | 5/1991 | DeMichele et al. ................. 414/563 |

FOREIGN PATENT DOCUMENTS

| | | | |
|---|---|---|---|
| 2212615 | * | 7/1973 | (DE) ..................................... 414/494 |
| 2821436 | * | 5/1978 | (DE) ..................................... 414/563 |
| 1230886 | * | 5/1986 | (RU) ..................................... 414/494 |
| 1553421 | * | 3/1990 | (RU) ..................................... 414/494 |

* cited by examiner

*Primary Examiner*—Steven A. Bratlie
(74) *Attorney, Agent, or Firm*—Donn K. Harms

(57) ABSTRACT

A vehicle carrier employs a hydraulicly tiltable "I" beam centered on the rear of a truck type carrier. A first and second wheel carriers are carried by and independently translatable along the "I" beam. The "I" beam is tilted off of the horizontal and the first wheel carrier engages the front wheels of the vehicle to be transported that are located adjacent to the back of the carrier vehicle. The wheels are then lifted off the support surface by tilting the "I" beam toward the horizontal. The second wheel carrier is then translated under the first wheel carrier and then under the rear wheels. After the four wheels are engaged the "I" beam tilts back to the horizontal further to lifting all of the wheels off of the support surface. The first and second wheel carriers are then translated along the "I" beam to a position over the vehicle carrier the rear wheels. The first wheel carrier is carried by the upper surface of the "I" beam and the second wheel carrier for the engaging the rear wheels positioned remote from the back of the carrier vehicle is carried by the lower surface of the "I" beam.

7 Claims, 2 Drawing Sheets

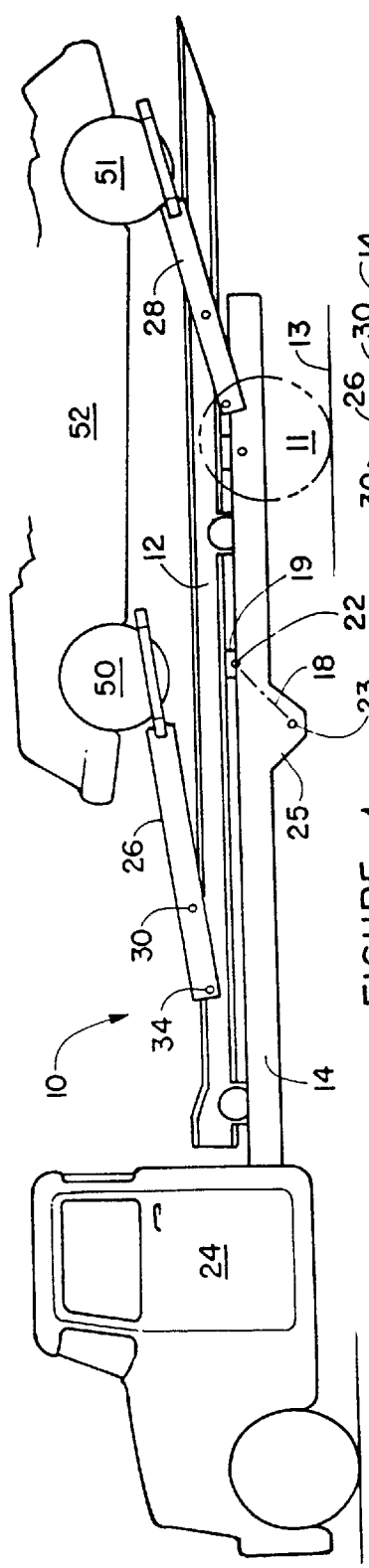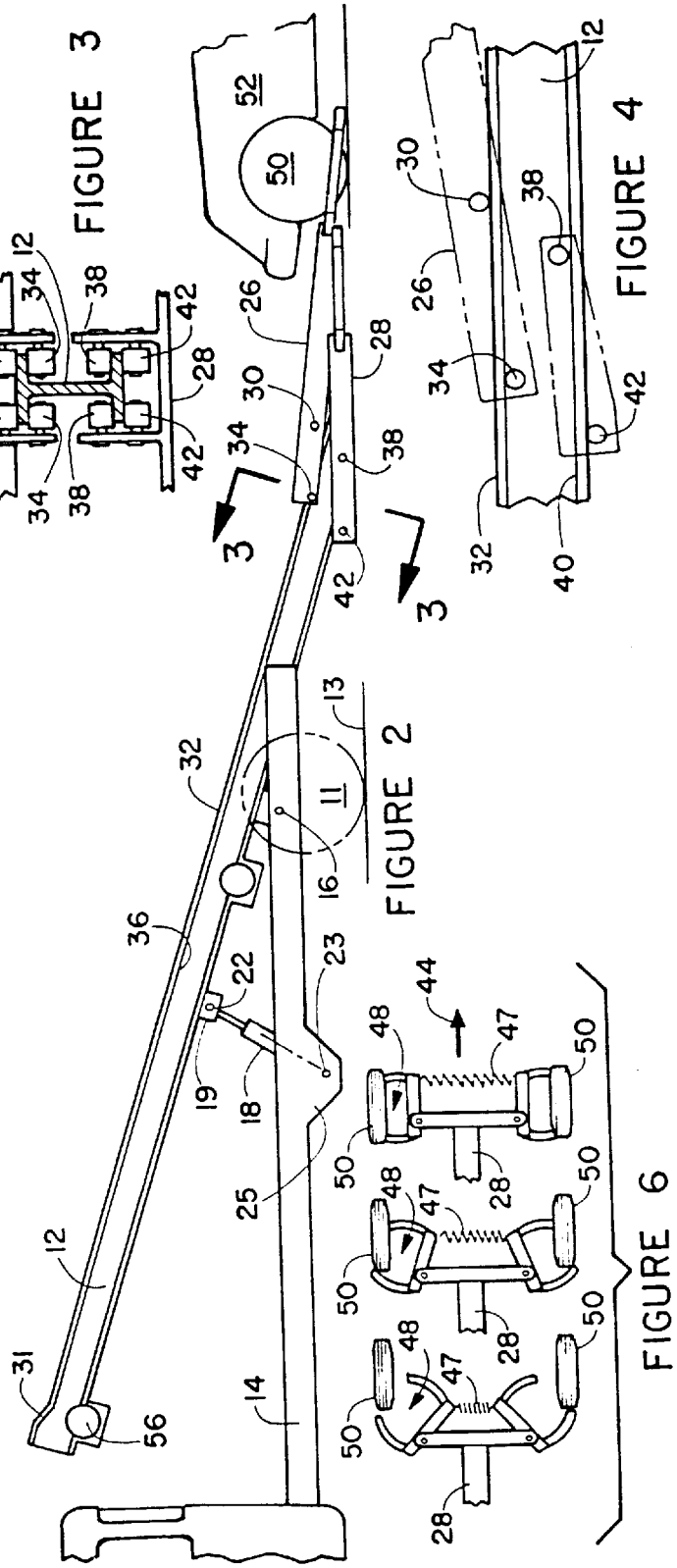

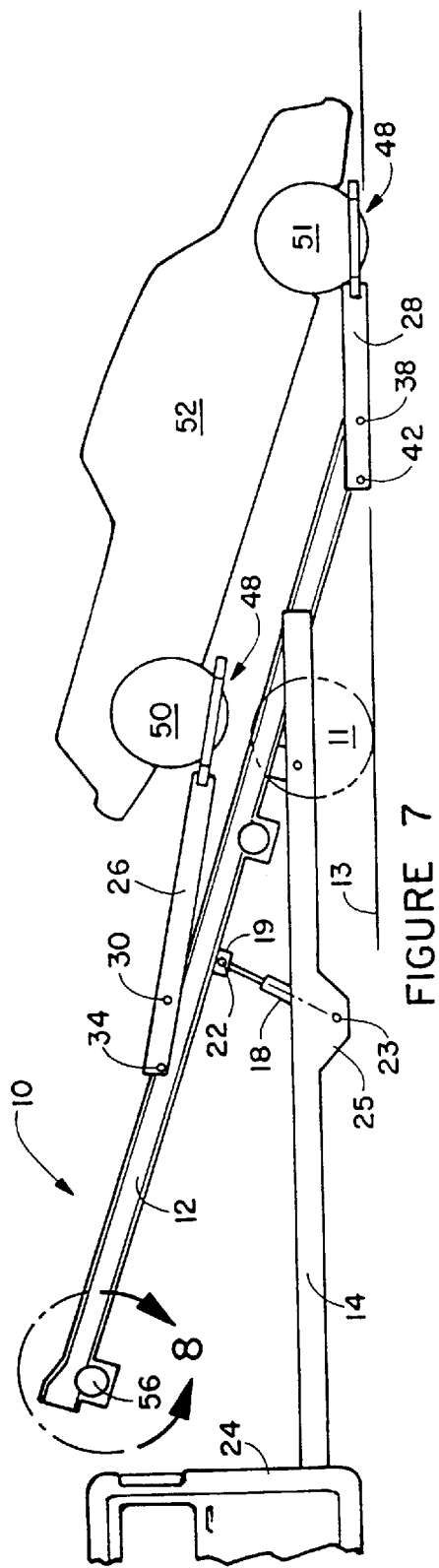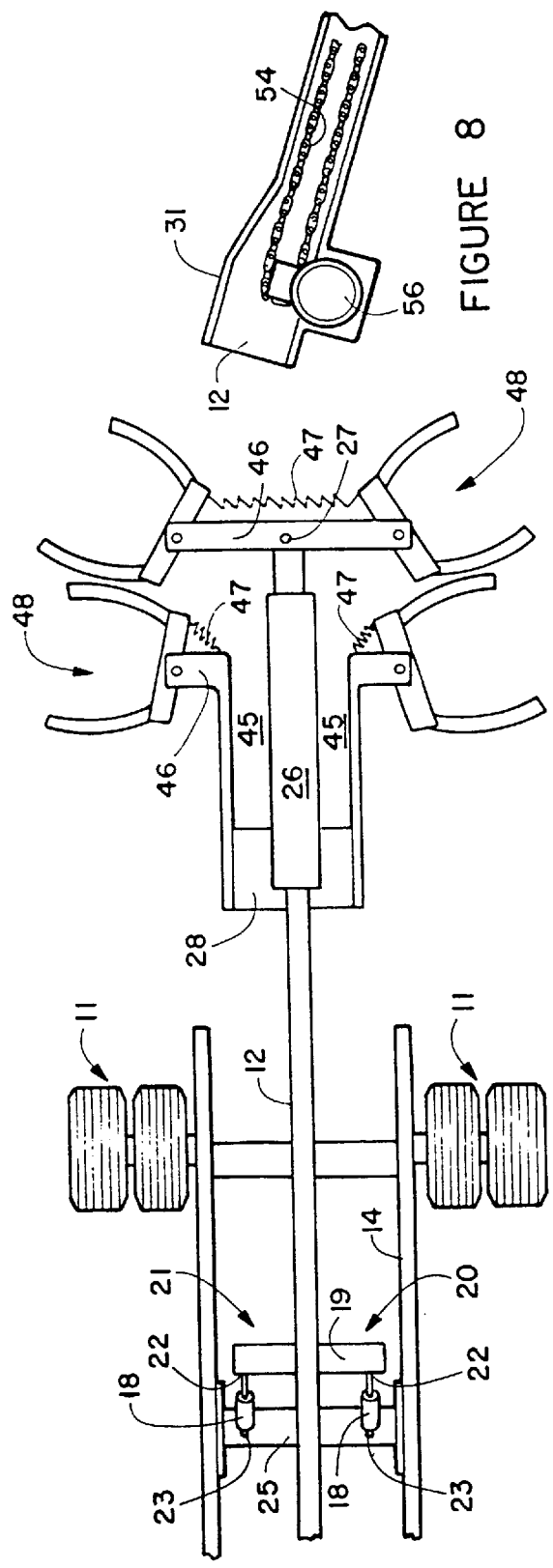

VEHICLE CARRIER

BACKGROUND OF THE INVENTION

This invention is directed to a vehicle carrier and more particularly to a vehicle carrier that can attach, lift and transport a four-wheel automobile from a fixed position completely immobile without manual assistance by the carrier operator.

Tow trucks or towing vehicles have been around for a long time and probably have existed since the invention of the automobile. In the early days of the automobile, due to their unreliability of operation for whatever reason requiring mechanic's assistance, being wrecked and inoperable required towing to the nearest repair garage. The first tow trucks as such were probably draft horses or the like. The use of horses was followed by automobiles using chains and the like to tow disabled automobiles. Later trucks with lift booms were used. Little effort was made to prevent damage to the vehicle being towed. In modern times, impounding of automobiles by the legal establishment and repossessing of automobiles required even additional requirement for tow trucks.

Modern day tow trucks are designed for ease of operation, safety and to prevention of damage to the vehicle being towed. Some of these modern tow trucks include the following:

In U.S. Pat. No. 5,607,279 Inventor Richard W Hill teaches a boom accessory for a flat bed tow truck that includes a frame that is lockable onto a power underlift hoist of a truck by retraction of a ram of the hoist against the truck frame. The frame includes a base for engagement on the ram, an upwardly and rearwardly extending boom member, and optionally, a rearward facing trailer hitch socket for permitting trailers to be towed with the boom accessory in place. A sleeve assembly is pivotally mountable atop the boom member for engaging a hook cable extending from a winch unit of the truck, the accessory extending the utility of the tow truck by enabling retrieval of disabled vehicles without significant modification of the truck. A method for hoisting a load by the flatbed tow truck includes the steps of providing the boom accessory, extending the ram, resting the base on the ram, retracting the ram for clamping the base between the head portion of the ram and the leg member, threading the cable over the sheave, connecting the cable to the load and activating the winch for moving and hoisting the load, the cable being movably supported by the sheave. All of the past and present tow trucks require that considerable manual labor to prepare the disabled vehicle for towing.

In U.S. Pat. No. 5,607,279 Inventor Richard W Hill teaches a boom accessory for a flat bed tow truck that includes a frame that is lockable onto a power underlift hoist of a truck by retraction of a ram of the hoist against the truck frame. The frame includes a base for engagement on the ram, an upwardly and rearwardly extending boom member, and optionally, a rearward facing trailer hitch socket for permitting trailers to be towed with the boom accessory in place. A sleeve assembly is pivotally mountable atop the boom member for engaging a hook cable extending from a winch unit of the truck, the accessory extending the utility of the tow truck by enabling retrieval of disabled vehicles without significant modification of the truck. A method for hoisting a load by the flatbed tow truck includes the steps of providing the boom accessory, extending the ram, resting the base on the ram, retracting the ram for clamping the base between the head portion of the ram and the leg member, threading the cable over the sheave, connecting the cable to the load and activating the winch for moving and hoisting the load, the cable being movably supported by the sheave. The use of this device is very labor intensive.

U.S. Pat. Nos. 4,797,057; 4,678,392 and 5,662,453 teach additional versions of wheel lifts for a tow truck. These patents like Hill above require considerable manual labor from the tow truck operator for their manipulation.

U.S. Pat. Nos. 5,662,453; 5,133,633 and 4,929,142 teach various renditions of vehicle carriers with tilt beds that tilt downward in the rear of the carrier to the same elevation as the vehicle to be transported and the vehicle a cable is attached by the vehicle carrier operator and the vehicle to be transported is pulled upon the tilted bed.

SUMMARY OF THE INVENTION

The vehicle carrier of the present invention employs a tilting "I" beam centered on the rear of a truck type carrier. First and second wheel carriers are carried by the "I" beam. The wheel carriers are translatable along the "I" beam. The first wheel carrier engages and lifts the wheels of the vehicle to be transported that are located adjacent to the back of the carrier vehicle. The first wheel carrier is carried by the upper surface of the "I" beam and the second wheel carrier for the engaging and lifting the wheels remote from the back of the carrier vehicle is carried by the lower surface of the "I" beam.

The first and second wheel carriers have "U" shaped yokes pivotally attached at each distal end of a cross member that is positioned normal to the longitudinal center line of the "I" beam. The yokes are spring biased toward the front of the vehicle to be carried so that one of the yoke arms first engages the front of a wheel and pivots around that wheel capturing the wheel as the wheel carrier is translated rearwardly away from the carrier vehicle.

The distal end of the "I" beam is angled to conform with the street or support surface that is at the level of the carrier vehicle and the vehicle to be transported. The "I" beam is rotated by a pair of hydraulic rams to position the rear distal end of the "I" beam to street level. The first wheel carrier is translated rearwardly along the "I" beam to engage the wheels adjacent to the back of the carrier vehicle. After engagement, the "I" beam is rotated away from the ground level lifting the first wheel carrier and engaged end of the vehicle carried by the support. The first wheel carrier is then translated toward the front of the carrier vehicle and the second wheel carrier is translated rearwardly of the carrier vehicle passing under the first wheel carrier. The second wheel carrier operates the same as the first wheel lift engages the remaining pair of wheels of the vehicle while translating rearwardly. After engagement, both the first and second wheel carriers are translated simultaneously toward the front of the carrier vehicle to equalize the weight of the carried vehicle on the vehicle carrier and the "I" beam is further rotated to a stowed position substantially horizontal to the carrier vehicle frame and support surface.

After loading, the carried vehicle can be transported to a desired location and unloaded from the carrier vehicle by reversing the above detailed loading procedure.

Unlike the prior art carrier vehicles, the operator of the carrier vehicle of the instant invention is not required to perform any manual labor to either load or unload the carried vehicle and does not even have to leave the cab of the carrier vehicle while loading or unloading a carried vehicle.

The principle object of this invention is to provide a carrier vehicle as described above that does not require any manual labor to load or unload a carried vehicle.

Another object of this invention is to provide a vehicle carrier that does not cause damage to the carried vehicle during loading, unloading or transport.

Yet another object of this invention is to provide an economically inexpensive vehicle carrier that provides ease of loading and unloading a carried vehicle.

Other objects and advantages will become obvious when taken into consideration with the following drawings and specifications.

BRIEF DESCRIPTION OF THE DRAWINGS

FIG. 1 depicts a side view of the vehicle carrier of the invention;

FIG. 2 depicts a side view of the "I" beam of the carrier of FIG. 1 pivoted in a deployed vehicle pickup position;

FIG. 3 is a cross-sectional showing taken along line 3—3 of FIG. 2;

FIG. 4 depicts the positional relationship of the two wheel carriers as one wheel carrier passes under the other wheel carrier during translation of either wheel carrier;

FIG. 5 is a partial plan view showing of the vehicle carrier of FIG. 1.

FIG. 6 depicts the wheel engaging action of the wheel carriers;

FIG. 7 depicts a pair of wheels positioned on one wheel carrier with the second wheel carrier being translated under the second set of vehicle wheels; and FIG. 8 is a detail of the end of the "I" beam 12 showing the drive motor and chain for translating a wheel carrier.

DETAILED DESCRIPTION OF THE PREFERRED EMBODIMENT

Referring now to the drawing Figures in detail, FIGS. 1 and 2 show the vehicle carrier 10 of the invention. Vehicle carrier 10 has support wheels 11 resting on a surface 13. The vehicle carrier 10 includes a tiltable beam 12 that is pivotally attached to the frame 14 of the vehicle carrier at pivot point 16 (see drawing FIG. 2). A pair of hydraulic actuators 18 power the tilt of the "I" beam between a stowed position as shown in FIG. 1 and a full tilt vehicle load position as shown in FIG. 2. Actuators 18 are pivotally connected to frame cross member 19 at pivots 22 and the "I" beam cross member 25 at pivots 23 as seen in the drawing. A conventional hydraulic pump of the sort well known in this art, which may be operated from the cab portion of the vehicle carrier 24, provides controlled hydraulic pressure to or bleeds hydraulic pressure from the actuator 18.

Carried by the "I" beam 12 are a pair of wheel carriers 26 and 28 that are translatable along the "I" beam from a stowed position as shown in FIG. 1 to various deployed positions as shown in FIGS. 2 and 4–5 and 7. The wheel carriers 26 and 28 are translated along the "I" beam by means of a pair of similar chains 54, see drawing FIG. 8, with one on each side of the "I" beam 12 with one attached to each carrier and operated by a hydraulic motor, electric motor 56 or the like suitable for the purpose intended.

Referring now specifically to drawing FIG. 3 and FIG. 4, FIG. 3 is a showing taken along line 3—3 of FIG. 2 and FIG. 4 is a section of the vehicle carrier of FIG. 2. FIGS. 3 and 4 depict the position of the wheel carriers 26 and 28 along "I" beam 12. Support rollers 30 of wheel carrier 26 rides along the top 32 of the "I" beam while carrier rollers 34 rides along the bottom of the upper surface 36 of the "I" beam 12. Support rollers 38 rides along the top of the lower surface 40 and rollers 42 rides along the bottom surface 40 of the "I" beam. These rollers support the wheel carriers as they are translated along the "I" beam. As seen in FIGS. 2 and 5, wheel carrier 26 can pass over carrier 28 during relative translation.

Referring now to drawing FIG. 5, a plan view of the vehicle carrier is shown. Wheel carriers 26 and 28 are substantially of the same configuration. The only differences are that the lower wheel carrier 28 has an opening 45 that allows for the wheel carrier 26 to pass over wheel carrier 28 as shown in drawing FIG. 5 and a different location for the biasing spring 47. Each wheel carrier includes a cross arm 46 that is normal to the "I" beam 12 with the exception that wheel carrier 26 has a pivot point 27 to allow an angled of approach to the wheels of the carried vehicle. On each distal end of the cross arm 46 is a pivotal "U" shaped wheel capturing member 48. Between each of the "U" members 48 is a bias spring 47 that pivots the "U" members toward each other as seen in FIGS. 5 and 6.

As can be seen in drawing FIG. 6 as the wheel carriers, either 26 or 28 translate along the "I" beam in the direction of arrow 44 one arm of the "U" members contact the front of a pair of wheels 50 on the vehicle 52 (FIG. 7) to be carried by the carrier and as the wheel carrier translates rearwardly the wheels are captured within the "U" member against the bias of spring 47.

Referring now specifically to drawing FIG. 7, this Figure depicts a vehicle 52 to be transported by the vehicle carrier 10. The vehicle 52 is shown with its front wheels in the wheel carrier 26 in a position to translate the wheel carrier 28 around rear wheels 51.

In operation, the "I" beam is tilted to allow the wheel carrier 26 to translate rearwardly to engage wheels 50, the wheel carrier 26 is then translated along the "I" beam 12 until the rear wheels 51 are in position for translation of the wheel carrier 28 rearwardly to capture the wheels 51 and then both wheel carriers 26 and 28 are simultaneously translated along the "I" beam 12 and the "I" beam is pivoted toward the vehicle carrier frame 14 to a position substantially horizontal to the carrier vehicle frame 14. The inclination of wheel carrier 26 changes to a smaller angle relative to the "I" beam 12 as it is translates over the curved surface 31 at the proximal end of the "I" beam 12 toward the cab 24. This feature improves the clearance between wheel carriers 26 and 28 and lowers the height of the front of the carried vehicle when moved proximally from the position shown in the drawing FIG. 1 position.

FIG. 8 depicts a chain 54 driven by a motor 56 either an hydraulic or electrical motor. Each wheel carrier has a similar independently operated drive. The chain 54 is attached to one of the wheel carriers and the wheel carrier is translated in a direction determined by the rotational direction of the motor 56. A similar drive on the opposite side of the "I" beam drives one of the wheel carriers as the one shown which is identical drives the other wheel carrier.

The materials of construction can be selected from any material suitable for the purpose intended.

It should be understood that all controls for pivoting the "I" beam or translating the wheel carriers can be operated from the interior or the exterior of the vehicle carrier.

Although the invention has been herein shown and described in what is conceived to be the most practical and preferred embodiments, it is recognized that departure may be made therefrom within the scope of the invention, which is not to be limited to the details disclosed herein but it is to be accorded the full scope of the claims so as to embrace any and all equivalent devices and apparatus.

What is claimed is:

1. A carrier vehicle for transporting a four-wheeled vehicle having a pair of spaced front wheels and a pair of spaced rear wheels, which comprises:

a transport bed for supporting said four-wheeled vehicle during transport thereof;

a beam extending along said transport bed, said beam having outwardly extending upper and lower flanges;

first and second wheel carrier assemblies each including connection means at distal ends for engaging front and rear wheels of a vehicle to be transported;

proximal ends of said first and second wheel carrier assemblies including roller means for engaging said flanges so that said first and second wheel carrier assemblies can move along said beam on a line substantially parallel to said beam;

drive means for independently moving said first and second wheel carrier assemblies along said beam; and actuator means for tilting said beam to allow said means for engaging said front and rear wheels to be brought into engagement with said front and rear wheels;

whereby said drive means can pull said vehicle to be transported onto said transport bed for transport.

2. The carrier vehicle according to claim 1 wherein said beam has a distal end extending beyond said support bed to approach the surface upon which said carrier vehicle is supported.

3. The carrier vehicle according to claim 1 wherein said beam is pivotally secured to said support bed and said actuator means comprises at least one hydraulic actuator.

4. The carrier vehicle according to claim 1 wherein said drive means comprises an electric motor and a chain drive for each of said first and second wheel carrier assemblies.

5. The carrier vehicle according to claim 1 wherein said connection means each comprises generally U-shaped assemblies movable upon contact with a wheel into straddling engagement with that wheel.

6. The carrier vehicle according to claim 1 wherein each of said roller means comprises first rollers at said proximal wheel carrier end for engaging a lower surface of said corresponding flange and second rollers distal of said first rollers for engaging said an upper surface of said corresponding flange.

7. The carrier vehicle according to claim 6 wherein said flanges are displaced upwardly over a distal end portion so that a supported vehicle is moved toward said support bed when said vehicle is moved fully onto said support bed.

* * * * *